(12) United States Patent
Howell et al.

(10) Patent No.: US 11,577,200 B1
(45) Date of Patent: Feb. 14, 2023

(54) VOC MITIGATION IN CURED IN PLACE PIPE INSTALLATION

(71) Applicant: INA Acquisition Corp., Wilmington, DE (US)

(72) Inventors: Jason Michael Howell, Ruston, LA (US); John Matthews, Choudrant, LA (US); Elizabeth Matthews, Choudrant, LA (US)

(73) Assignee: INA Acquisition Corp., Wilmington, DE (US)

( * ) Notice: Subject to any disclaimer, the term of this patent is extended or adjusted under 35 U.S.C. 154(b) by 21 days.

(21) Appl. No.: 17/232,703

(22) Filed: Apr. 16, 2021

(51) Int. Cl.
    *B01D 53/86* (2006.01)
    *F16L 55/18* (2006.01)

(52) U.S. Cl.
    CPC .... *B01D 53/8668* (2013.01); *B01D 2255/102* (2013.01); *B01D 2257/708* (2013.01); *B01D 2258/02* (2013.01); *F16L 55/18* (2013.01)

(58) Field of Classification Search
    CPC .......... B01D 53/8668; B01D 2257/708; B01D 2258/02; B01D 2255/102; F16L 55/18; F16L 58/1009; E03F 5/021
    See application file for complete search history.

(56) References Cited

U.S. PATENT DOCUMENTS

| | | | | |
|---|---|---|---|---|
| 3,494,813 A | * | 2/1970 | Holcomb | E29C 49/26 138/146 |
| 5,383,311 A | * | 1/1995 | Strickland | E02D 29/125 138/146 |
| 5,389,692 A | * | 2/1995 | Bertram | F16L 58/1009 521/905 |
| 5,914,091 A | | 6/1999 | Holst et al. | |
| 6,513,324 B2 | | 2/2003 | Bruck et al. | |
| 7,521,087 B2 | | 4/2009 | Rosynsky et al. | |
| 2016/0131298 A1 | * | 5/2016 | Schleicher | B29C 63/06 138/98 |
| 2018/0305521 A1 | * | 10/2018 | Hazen | C08K 5/14 |
| 2021/0317940 A1 | * | 10/2021 | Kiest, Jr. | F16L 55/1652 |

FOREIGN PATENT DOCUMENTS

| | | | | | |
|---|---|---|---|---|---|
| CN | 104 791 580 A | * | 7/2015 | .......... | F16L 58/1009 |
| CN | 108 554 021 A | * | 9/2018 | ............. | B01D 53/72 |
| CN | 110 848 473 A | * | 2/2020 | ............. | F16L 58/14 |
| CN | 111 720 746 A | * | 9/2020 | ............. | F16L 55/18 |
| EP | 2754491 A1 | | 7/2014 | | |
| GB | 2 185 196 A | * | 7/1987 | ............... | B05D 7/22 |

(Continued)

OTHER PUBLICATIONS

Kramer, Jan; Metallic Doc Substrates; Vitesco, Emitec, Sensing & Actuation, Catalyst technologies; Jan. 29, 2020; 10 pages.

(Continued)

*Primary Examiner* — Timothy C Vanoy
(74) *Attorney, Agent, or Firm* — Stinson LLP (57) ABSTRACT

A method for removing VOCs from exhaust gases of a CIPP curing process, the method including the steps of: (a) positioning an exhaust conduit to capture the exhaust gases; (b) elevating the temperature of at least a portion of the exhaust gases and passing the exhaust gases over a catalyst containing substrate to form a devolitized gas stream; and (c) directing the devolitized gas stream to an exhaust stack.

12 Claims, 9 Drawing Sheets

(56) References Cited

FOREIGN PATENT DOCUMENTS

| LV | 15 488 A | * | 3/2020 | ............. B05D 3/067 |
|----|----------|---|--------|--------------------------|
| WO | 2001010573 A2 | | 2/2001 | |
| WO | 2001010573 A3 | | 2/2001 | |
| WO | WO 2018 033 589 A1 | * | 2/2018 | ............... B05D 1/02 |

OTHER PUBLICATIONS

Vitesco Technologies Wins Major Order from European Vehicle Manufacturor; Press Release; Vitesco Technologies; Mar. 12, 2020; 3 pages.

ASTM International; Standard Practice for Calculation of Pore Size Distributions of Catalysts from Nitrogen Desorption Isotherms; Designation: D 4641-94 (Reapproved 1999); May 1999; 6 pages.

\* cited by examiner

VOC MITIGATION IN CURED IN PLACE PIPE INSTALLATION

I. BACKGROUND

Cured-in-place pipe (CIPP) is an in-situ rehabilitation technique applicable to many pipe systems, including sanitary sewers, storm sewers, and drinking water pipes. In the steam-cured CIPP process, a felt liner is wetted with a liquid resin, with styrene often being an important and common component in these resins. The liner is inserted into an existing, compromised pipe, and the liner is then inflated with air and steam. This step both expands the liner and begins to cure the liner. The curing temperature varies, but in many instances is approximately 90° C. (195° F.). The process can be used to line sections of pipe over 500 m long. The liner section is terminated at a downstream manhole. The exhaust steam from the curing process exits the liner at this liner termination. The exhaust typically exits a small diameter hose attached to the end of the liner, which is used to restrict the airflow and, thereby, inflate the liner.

While an efficient pipe rehabilitation technique, concerns have been raised regarding the exhaust from CIPP installations. Although emissions dissipate quickly and fall to safe levels as distance from the exhaust point increases, styrene levels in the visible white plume of steam cured CIPP exhaust, and in the area very near the exhaust points, have the potential to exceed regulatory limits. The exhaust manifold and termination manhole of a CIPP installation are the locations where there is reasonable concern for both worker and public exposure to styrene emissions. An improvement in the art would be an apparatus and method designed to ensure safety for CIPP installers and for the general public by consolidating exhaust point emissions and catalyzing chemical reactions that will eliminate the volatile organic compound (VOC) emissions and, thereby, mitigate any potential hazards.

II. SUMMARY OF SELECTED EMBODIMENTS OF THE INVENTION

One embodiment of the invention is a method for removing VOCs from exhaust gases of a CIPP curing process. The method will include the steps of (a) positioning an exhaust conduit to capture the exhaust gases, (b) elevating the temperature of at least a portion of the exhaust gases and passing the exhaust gases over a catalyst containing substrate to form a devolitized gas stream, and then (c) directing the devolitized gas stream to an exhaust stack.

One embodiment of an apparatus for carrying out this method includes a housing which has a primary exhaust stream conduit from a CIPP liner and a fugitive exhaust stream conduit. A preheater receives the fugitive exhaust stream and is configured to raise the fugitive exhaust stream to at least 90° C., while the primary exhaust stream bypasses the preheater. A mixing chamber combines the heated fugitive exhaust stream and the primary exhaust stream to form a combined exhaust stream. A heated, hydrophobic catalyst structure receives the combined exhaust stream, and an exhaust stack receives the combined exhaust stream from the catalyst structure and reduces the combined exhaust stream to under 85° C.

IV. DETAILED DESCRIPTION OF SELECTED EMBODIMENTS OF THE INVENTION

Figure 1A:
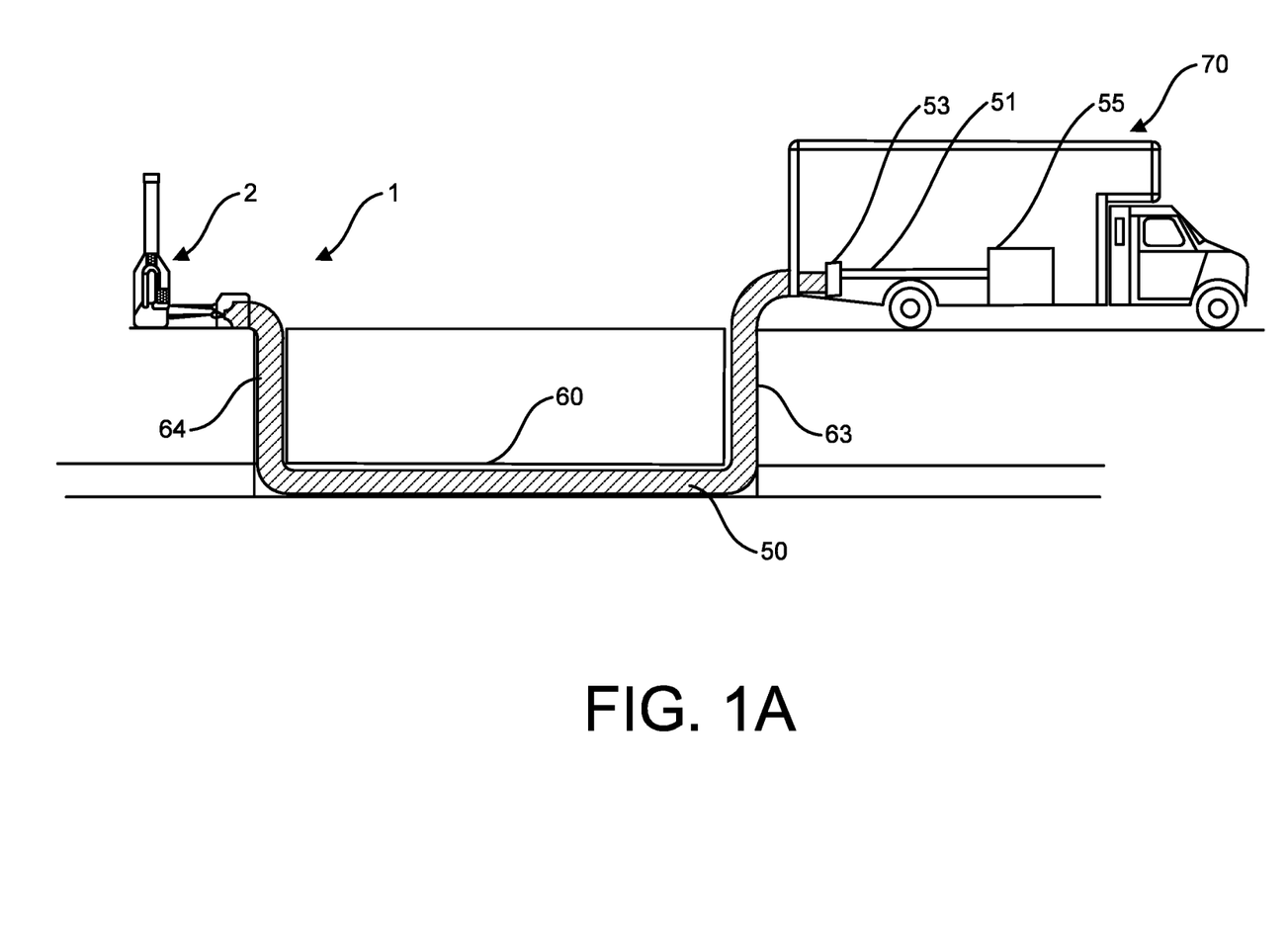
FIG. 1A is a conceptual illustration of a first embodiment of the CIPP process of the present invention.

FIG. 1A is a schematic or conceptual illustration of the environment in which the invention and the CIPP process takes place. FIG. 1A shows an entry manhole 63 and a termination manhole 64 with a section of damaged pipe to be repaired (or "host" pipe) 60 running between the manholes. A CIPP liner insert 50 is shown as positioned within host pipe 60. As part of the conventional CIPP process, a steam supply hose 51 is fitted to the starting end of CIPP liner insert 50 with a substantially pressure tight coupler 53. A steam source or generator 55 (shown positioned in utility truck 70) directs steam through steam supply hose 51 into liner 50, typically at a flow rate of between about 50 and 400 cfm. In the FIGS. 1A and 1B embodiment, liner 50 extends outside of termination manhole 64 and terminates within external seal block 38. External seal block 38 will include an entrance port 39 which will approximate or be somewhat less than the inflated diameter of liner insert. Liner insert 50 passes though entrance port 39 and will be connected to steam exhaust hose or primary exhaust conduit 4 with the connector 53. Connector 53 creates as air-tight of a connection as practical, but it is not uncommon that some steam escapes around connector 53 into the internal space 40 of external seal block 38. This escaping steam may sometimes be referred to as "fugitive exhaust" or "fugitive gas." As will be explained in more detail below, this fugitive exhaust will be captured by fugitive exhaust line 6 communicating with internal space 40.

Steam exhaust hose 4 is sized such that, when steam is injected into CIPP liner insert 50, a pressure increase (e.g., 5 psig to 25 psig depending on liner weight) is created within CIPP liner insert 50, expanding the liner insert against the interior wall of host pipe 60, with the heat from the steam initiating the curing process for the resin impregnated liner insert. The steam exiting the liner (the "primary exhaust") may have a styrene concentration of any range between 0 and 2000 parts-per-million (ppm), but more commonly between 650 ppm and 850 ppm.

Figure 1B:
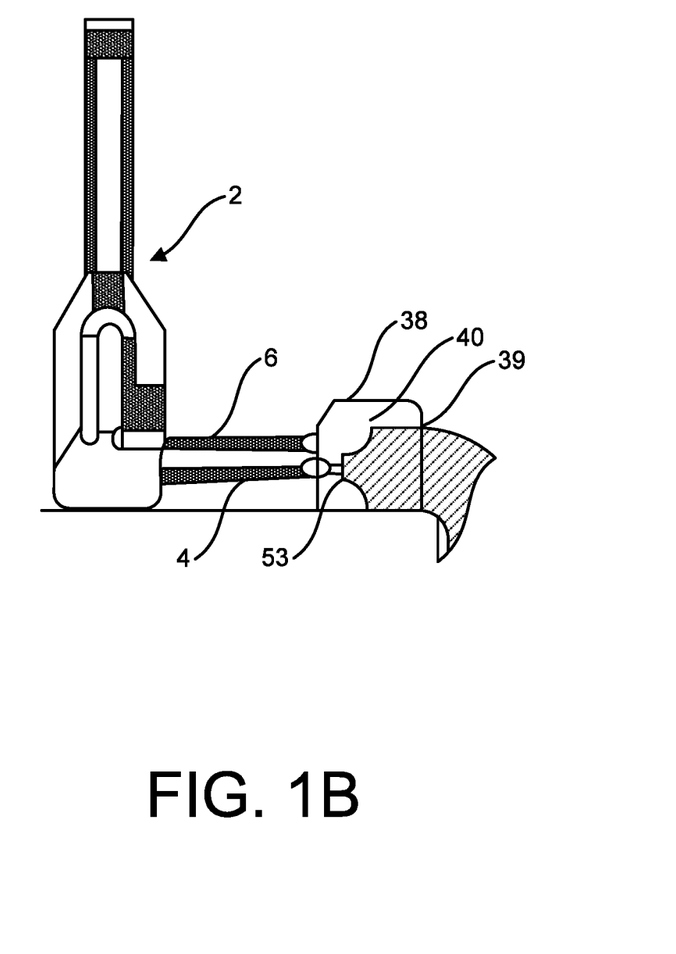
FIG. 1B is an enlarged illustration of the housing and external seal block of FIG. 1A.

One embodiment of the apparatus and method for removing VOCs from the CIPP exhaust stream is suggested by the housing 2 and the external seal block 38 seen in FIG. 1B. As described above, the fugitive exhaust conduit 6 communicates with the internal space 40 of the external seal block 38. Primary exhaust conduit 4 is connected to CIPP liner 50. In other words, primary exhaust conduit 4 ultimately receives the steam exiting the liner during the curing process. In one embodiment, both the fugitive exhaust conduit 6 and the primary exhaust conduit 4 are 80 mm diameter hose.

Figure 2:
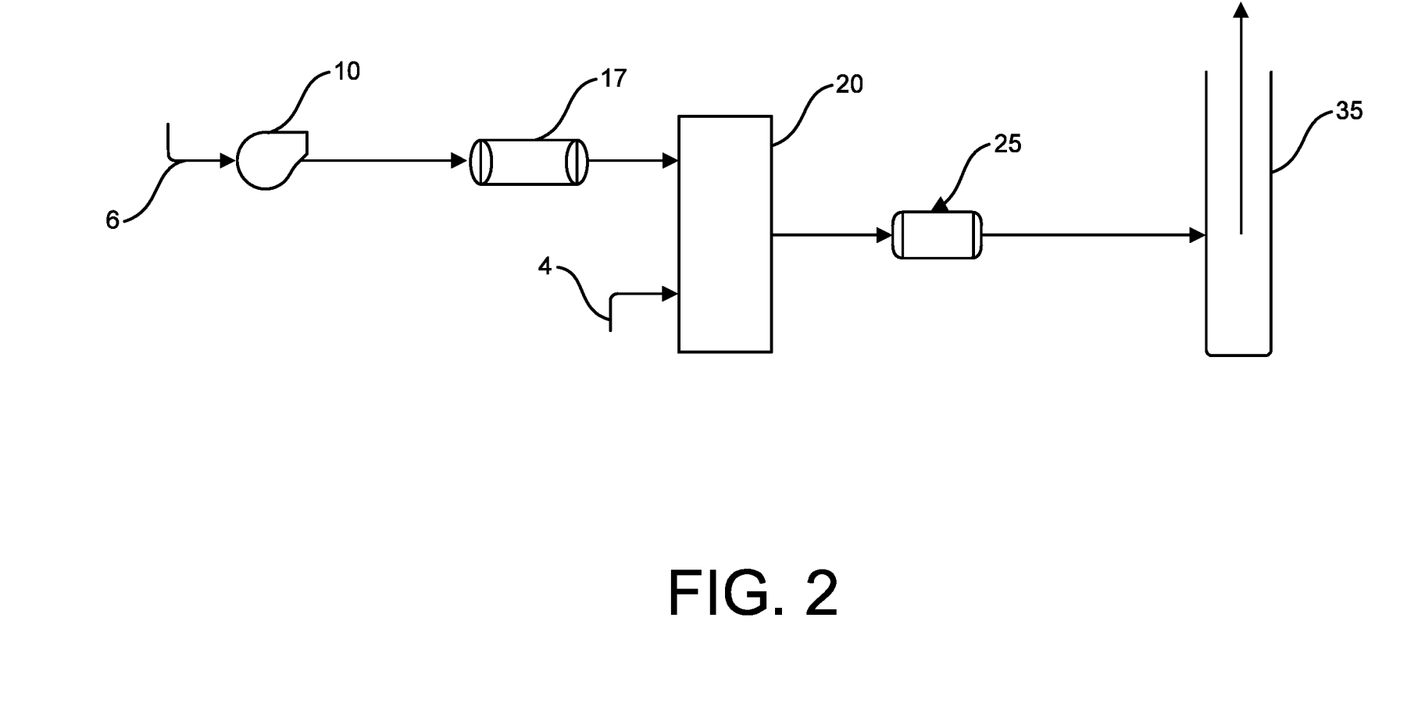
FIG. 2 is a schematic flow diagram of a first embodiment of the present invention.
Figure 4:
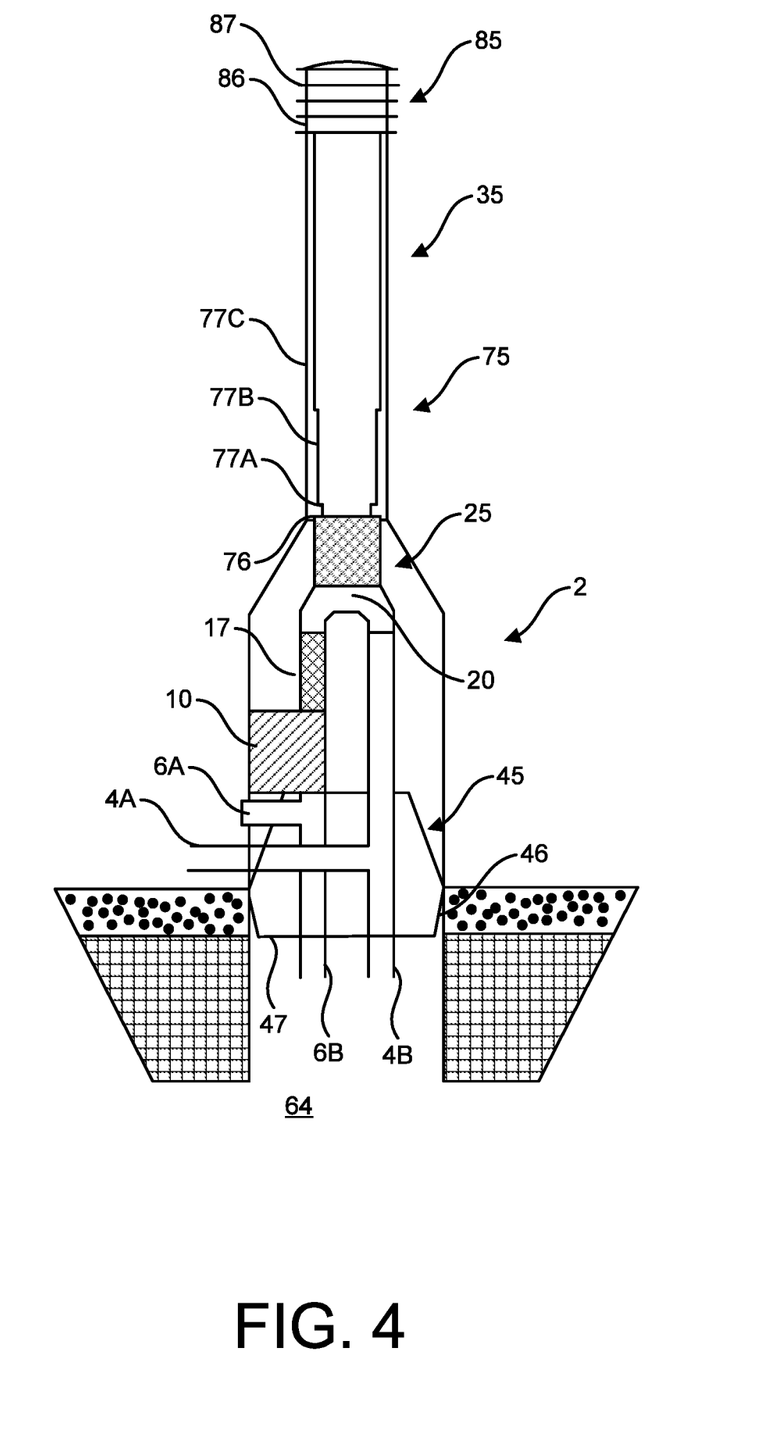
FIG. 4 is a cross-sectional view of one embodiment of an enclosure or housing for components used in the CIPP process.

Although FIG. 1B shows fugitive exhaust conduit 6 and primary exhaust conduit 4 entering housing 2, FIGS. 2 and 4 illustrate in more detail how those conduits will connect to individual components found in housing 2. Seen schematically in FIG. 2, the fugitive exhaust conduit 6 will be connected to fan 10 which acts to draw in gases existing in the internal space 40 of external seal block 38. In many embodiments, fan 10 is capable of moving any range of air volume between 150 cfm and 750 cfm, but 300 cfm to 400 cfm will normally be sufficient. In one example embodiment, fan 10 is a Cloudline T6 (AI-CLT6) available from AC Infinity, Inc. of City of Industry, Calif. Typically, it is desirable that fan 10 have sufficient air moving capacity to evacuate any gases in termination manhole 64 when the invention is employed in the FIGS. 6 and 7 configurations described below. Because of the partial vacuum fan 10 maintains in the internal space 40 of external seal block 38 in the FIG. 1B embodiment, there need not be a perfectly airtight seal between liner 50 and the entrance port 39 of external seal block 38. This arrangement may be referred to as a "negative pressure seal." In other words, fan 10 will typically have sufficient air moving capacity to evacuate both the (fugitive) gases in internal space 40 and any air leaking past the liner/entrance port interface, thereby maintaining a negative pressure seal around entrance port 39.

Often, the fugitive exhaust gases collected at fan 10 are not at a sufficiently high temperature to be efficiently treated in the catalytic converter (as described below). In such cases, the fugitive exhaust gases are subject to one or more heating steps. FIG. 2 suggests one example of this fugitive exhaust heating step being accomplished via the use of an auxiliary heater 17, for example, an electrically heated air process heater. One example of this air process heater may be a tube-shaped auxiliary heat chamber filled with coiled electrical heating elements such as, for example, a MAO-10F1 (2.375" diameter, 10" length, 1 kW, 120V with standard entry flange) available from O.E.M. Heaters of Minneapolis, Minn. This heater provides heat energy of 125 W per sq in. In this embodiment, the auxiliary heater 17 will raise the temperature of the fugitive exhaust gases to at least 90° C. As suggested in FIG. 2, this embodiment of the process does not include the primary exhaust in the flow path through the auxiliary heater 17, i.e., the primary exhaust bypasses auxiliary heater 17 because the partially-cured resin particulate in the primary exhaust could potentially lodge and even cure within the auxiliary heater. However, there could be embodiments where this resin particulate issue is less of a concern and the primary exhaust could be directed through the auxiliary heater.

The fugitive exhaust stream is then directed to mixing chamber 20 where it mixes with the primary exhaust stream to form a combined exhaust stream. In some embodiments as suggested in FIGS. 2 and 3, mixing chamber 20 is a specific volume constructed for the mix function and may or may not contain baffles or other flow devices to enhance mixing. However, in other embodiments, the mixing chamber may simply be the "Y" junction of two separate pipes or conduits being joined to create single fluid path. For example, FIG. 4 shows a mixing chamber 20 which is simply the area where fugitive exhaust conduit 6 and primary exhaust conduit 4 join prior to directing the combined exhaust stream being directed into catalytic converter 25.

From mixing chamber 20 (or fugitive and primary exhaust junction 20), the combined exhaust stream is passed to the catalytic convertor 25. Styrene has an auto-ignition temperature between 427° C. and 490° C. However, a specially formulated hydrophobic platinum catalyst may be used in this embodiment to promote the oxidizing reaction, causing styrene to react with oxygen at a much lower temperature when in contact with the catalyst. Thus, for example, the reaction temperature of styrene in the presence of a platinum-based catalyst is nearly half the auto-ignition temperature, e.g., approximately 270° C. In many embodiments, the combined exhaust stream will be passed through a catalyst structure, or typically, a substrate carrying a catalyst material. In one particular embodiment, the catalyst structure is a wash coat of alumina ($Al_2O_3$) wherein about 3% of the wash coat (i.e., 3% by weight of the wash coat) is platinum (Pt) and about 2% of the wash coat (by weight) is palladium (Pd). The Pt and Pd particles had an average diameter ranging from about 3 um to about 12 um. The percent surface area of the wash coat covered by a catalyst in many embodiments will range between 1% and 15% (or any subrange in between), and in preferred embodiments is about 5%. Pt, Pd, and Rh are the most active and effective catalysts for driving hydrocarbon oxidation reactions and many variations (including alloys) thereof are preferred catalyst materials. However, there may be situations where alternative catalyst materials are employed. The alumina wash coat may be formed by many different conventional processes. For example, the material forming the substrate for the wash coat may be dip coated with an ionized salt-based solution. Salt crystals on the substrate surface are then removed to leave a micro-porous surface. The alumina will generally result in a hydrophobic surface. Then the substrate may be dipped in a solution containing the catalyst, and catalyst particles will bind to the alumina. The wash coat will typically have a specific surface area (as determined, for example, by ASTM D4641-87 1988) ranging between 10 and 400 $m^2/g$, with more preferred embodiments have a surface area between 100 and 200 $m^2/g$. In certain embodiments, the pores in the wash coat may range between 10 nm and 1 um (or any subrange in between).

Figure 5A:
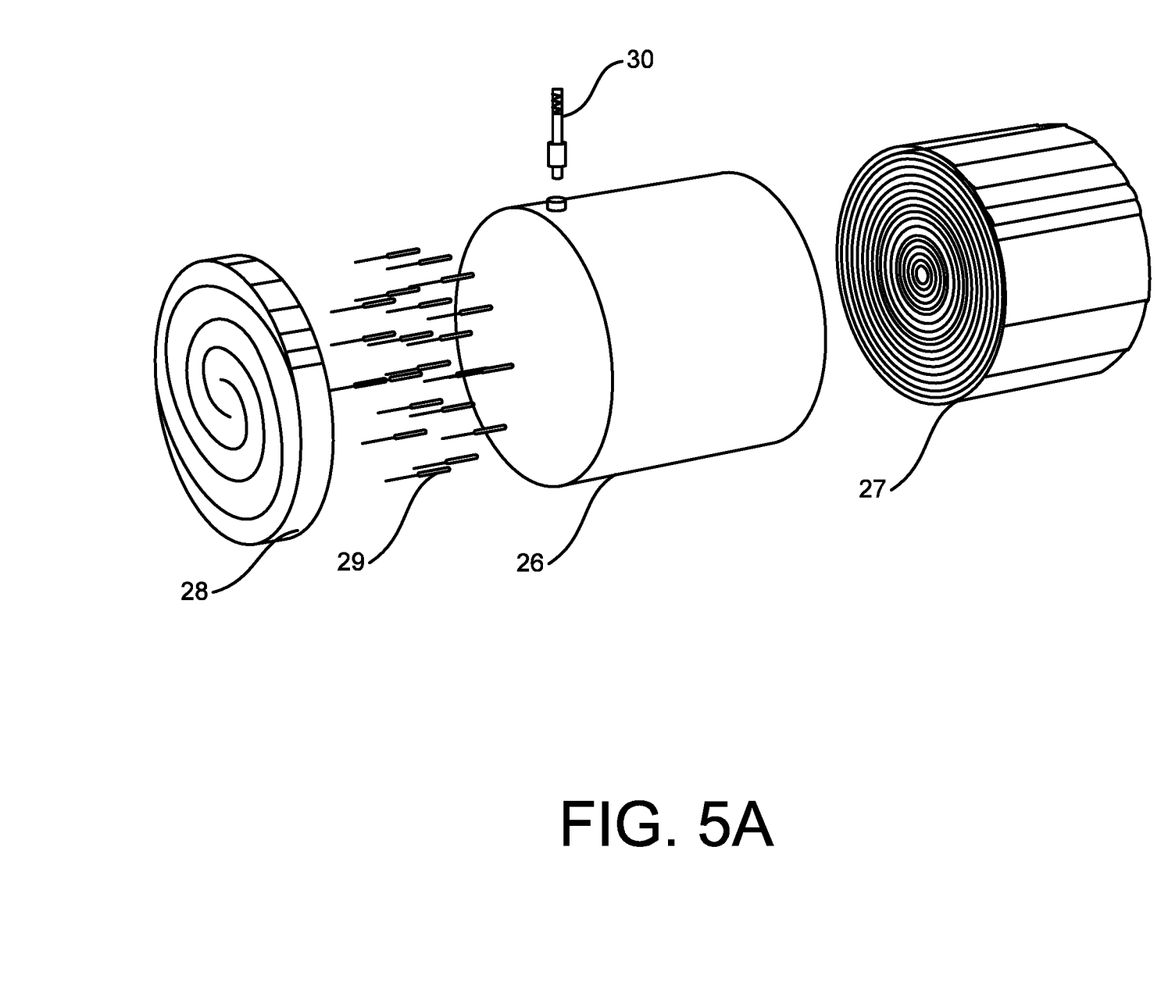
FIG. 5A is a conceptual illustration of one embodiment of an EHC system.
Figure 5B:
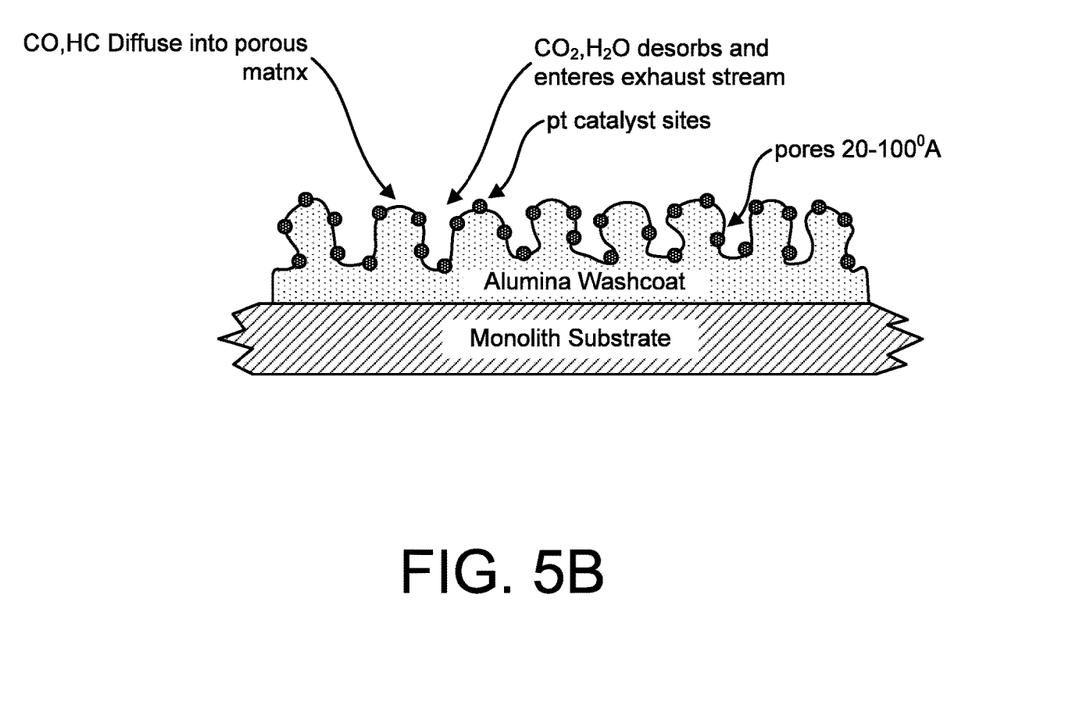
FIG. 5B is a conceptual illustration of the catalyst washcoat on a substrate.

In the illustrated embodiment, the catalytic convertor is an electrically heated catalyst (EHC) system. As suggested in FIG. 5A, the EHC directly heats a metallic substrate, heating the catalyst surface and the exhaust passing over those surfaces and through the catalyst matrix. The electrically heated catalyst is composed of two parts: the conventional catalyst substrate 27 and an electrically heated catalyst disc 28. In this embodiment, the catalyst substrate 27 is a foil-like aluminum sheeting onto which the above described wash coat has been formed. The aluminum sheeting is then rolled onto itself to create the structure seen in FIG. 5A. The catalyst substrate 27 and heating disc 28 will be positioned in the outer mantle or housing 26. The heating disc 28 is supported adjacent to the catalyst substrate by insulated pins 29 and is connected to an external power source through two electrical pins 30 (only one shown) common in automotive electrical systems. As the combine exhaust stream is passed through the heating disc and catalyst substrate, the EHC will heat the exhaust to a reaction temperature range of between 270° C. and 350° C., generating a VOC removal efficiency of 95% at 270° C. and 98% at 350° C. It will be understood that the heating disc primarily heats the exhaust which, in turn, heats the catalyst substrate which follows (in the direction of flow) the heating disc. Some heat is transferred directly from the heating disk to the catalyst substrate, but the primary role of the heating disk is to heat the air/exhaust. The electrically heated catalyst also tends to prevent spoiling of the catalyst surface and further reduces the overall temperature needed for oxidation by focusing the heat increase on the surface of the catalyst. In one preferred embodiment, the EHC is the Emicat® active catalyst system available from Vitesco Technologies Emitec GmbH of Lohmar, Germany.

As seen in FIG. 2, the heated gas leaving the catalytic convertor will travel to exhaust stack 35. In many embodiments, exhaust stack 35 will be an insulated stack to ensure that the still high-temperature treated exhaust will exit the device at a height which allows the exhaust to dissipate and cool before entering the populated zone. To aid in cooling the exhaust, the FIG. 4 embodiment of exhaust stack 35 includes a diluter 75 and diffuser 85 positioned above the diluter 75. The diluter will include an air intake 76 at the base of the diluter and a series of increasing area cross-sections 77A to 77C, with openings at each point in the stack where the cross-section changes. The increasing area cross-sections will draw cooler outside air into the exhaust stack as the exhaust gases travel upwards. Thus, diluter 75 will mix ambient air with the treated exhaust stream within the exhaust stack. Diluter 75 relies upon both induced and entrained ambient air flow. The exhaust gases leaving diluter 75 will encounter diffuser 85 at the upper end of exhaust stack 35. In the FIG. 4 embodiment, diffuser 85 will include a series of radial outlets 86 between diffuser vanes 87.

As suggested in FIG. 1 and shown in more detail in FIG. 4, one embodiment of the VOC mitigation system will position the components of FIG. 2 in a housing 2. In addition to the exhaust stack 35 discussed above, FIG. 4 shows how the fugitive exhaust conduit 6 is connected to fan 10 and auxiliary heater 17 before reaching the mixing area 20. Similarly, primary exhaust conduit 4 will direct primary exhaust to the mixing area 20 to mix with fugitive exhaust before being directed to catalytic converter 25. The FIG. 4 embodiment of housing 2 includes a base plug 45 which allows housing 2 to be utilized in different modes of operation. In FIG. 4, the housing is positioned over the terminus manhole 64 (see also FIG. 6). In this mode of use, the circumferential sloping sidewall 46 is sufficiently narrow at its bottom to be inserted into manhole 64, but the top of sidewall 46 is sufficiently wide become wedged against the inner circumference of manhole 64 and firmly retain base plug 45 within manhole 64. It will be understood that base plug 45 will be sized to "plug" standard manhole diameters, such as 24", 30", or in some cases, up to 48".

Figure 6:
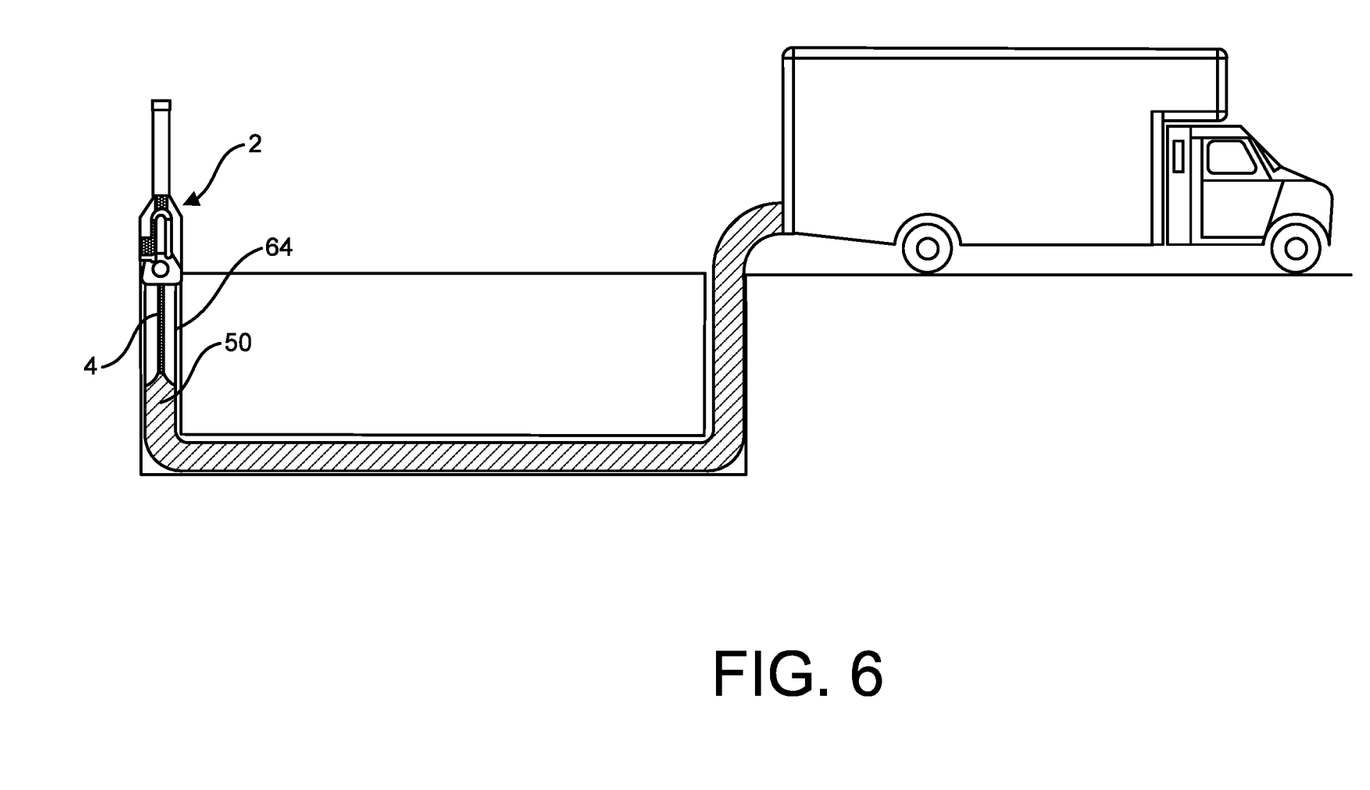
FIG. 6 is a conceptual illustration of a second embodiment of the CIPP process of the present invention.

FIG. 6 suggests how the a CIPP liner installation process would be carried out when the VOC mitigation system housing 2 is position in a manhole 64 such as seen in FIG. 4. The CIPP liner 50 is connected to the primary exhaust conduit 4 within manhole 64 and enters housing 2 through the lower branch 4B (see FIG. 4) of primary exhaust conduit 4. Any fugitive exhaust gases escaping the connection between CIPP liner 50 and primary exhaust conduit 4 will be drawn into the lower branch 6B of fugitive exhaust conduit 6 (which is open to the interior space of manhole 64) by the pressure drop produced by fan 10. It will be understood that side branches 4A and 6A in FIG. 4 will normally be blocked when housing 2 is positioned within a manhole opening. It will be apparent that the surface where plug 45 meets the inner surface of the manhole opening forms a "negative pressure seal" with the open street surface area surrounding the manhole opening. Thus, manhole cover 43 need not form a perfectly airtight seal as long as the interior of manhole 64 is maintained somewhat below the atmospheric pressure existing outside the manhole.

In many embodiments, the housing 2 will be a thermally insulated enclosure. Although not explicitly shown in FIG. 4, one embodiment of the housing would include a frame made of square aluminum tubing with metal sheeting forming the exterior surface of the housing. To make the device transportable, recessed handles and casters may be mounted to the aluminum frame. A control panel may also be mounted to the mitigation device. This control panel would serve as a connection point for an external power supply. Controls could include on/off switches for individual components, a speed control for the in-line exhaust fan, a thermostat control for the electrically heated catalyst, and temperature sensor displays. Temperature sensor displays will allow the user to monitor the exhaust temperatures before the auxiliary heater, after the auxiliary heater, before the electrically heated catalyst, after the electrically heated catalyst, and at the exhaust point. Certain embodiments of housing 2 will have sufficient internal space that, when being transported, the exhaust stack may be detached and stored within the housing.

Figure 7:
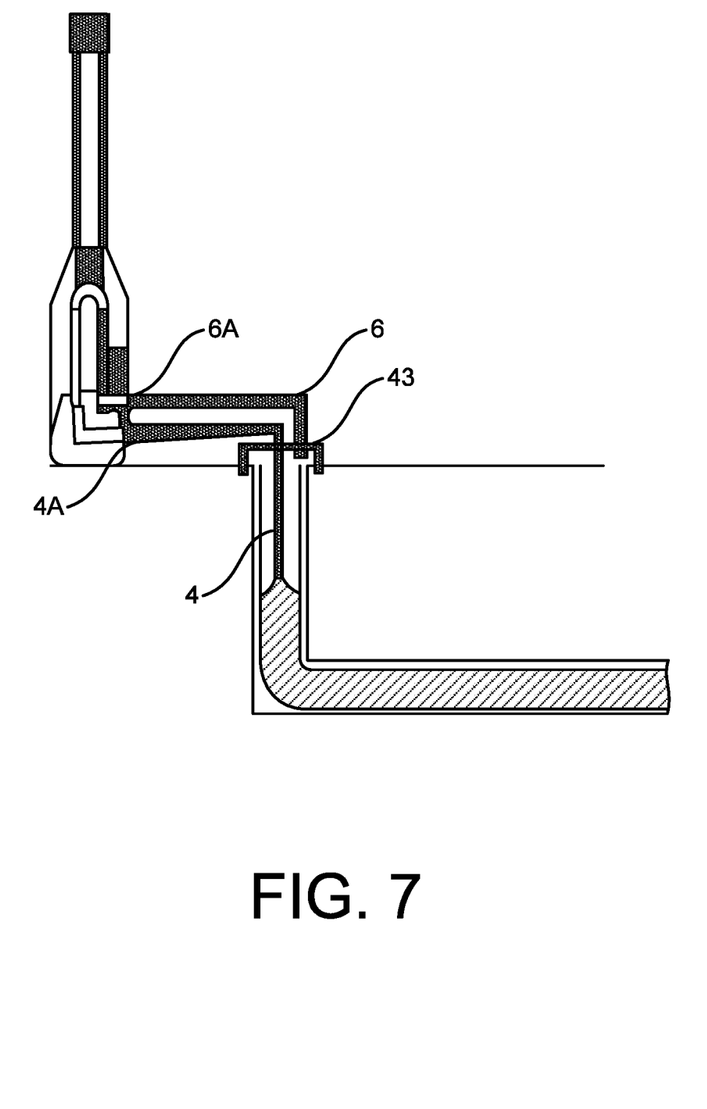
FIG. 7 is a conceptual illustration of a third embodiment of the CIPP process of the present invention.

FIG. 7 illustrates a slightly different manner of employing VOC mitigation system housing 2. In this embodiment, the apparatus and method for removing VOCs from the CIPP exhaust stream utilizes the manhole cover 43. Extending through manhole cover 43 are the fugitive exhaust conduit 6 and the primary exhaust conduit 4 which will be connected to their respective side branches 6A and 4A seen in FIG. 4. Again, the interface between manhole cover 43 and the manhole opening need only be sufficiently tight that a negative pressure seal can be maintained by fan 10. The same would be true of any fittings by which conduits 4 and 6 extend through manhole cover 43. As in previous embodiments, both the fugitive exhaust conduit 6 and the primary exhaust conduit 4 could be 80 mm diameter hose.

Figure 3:
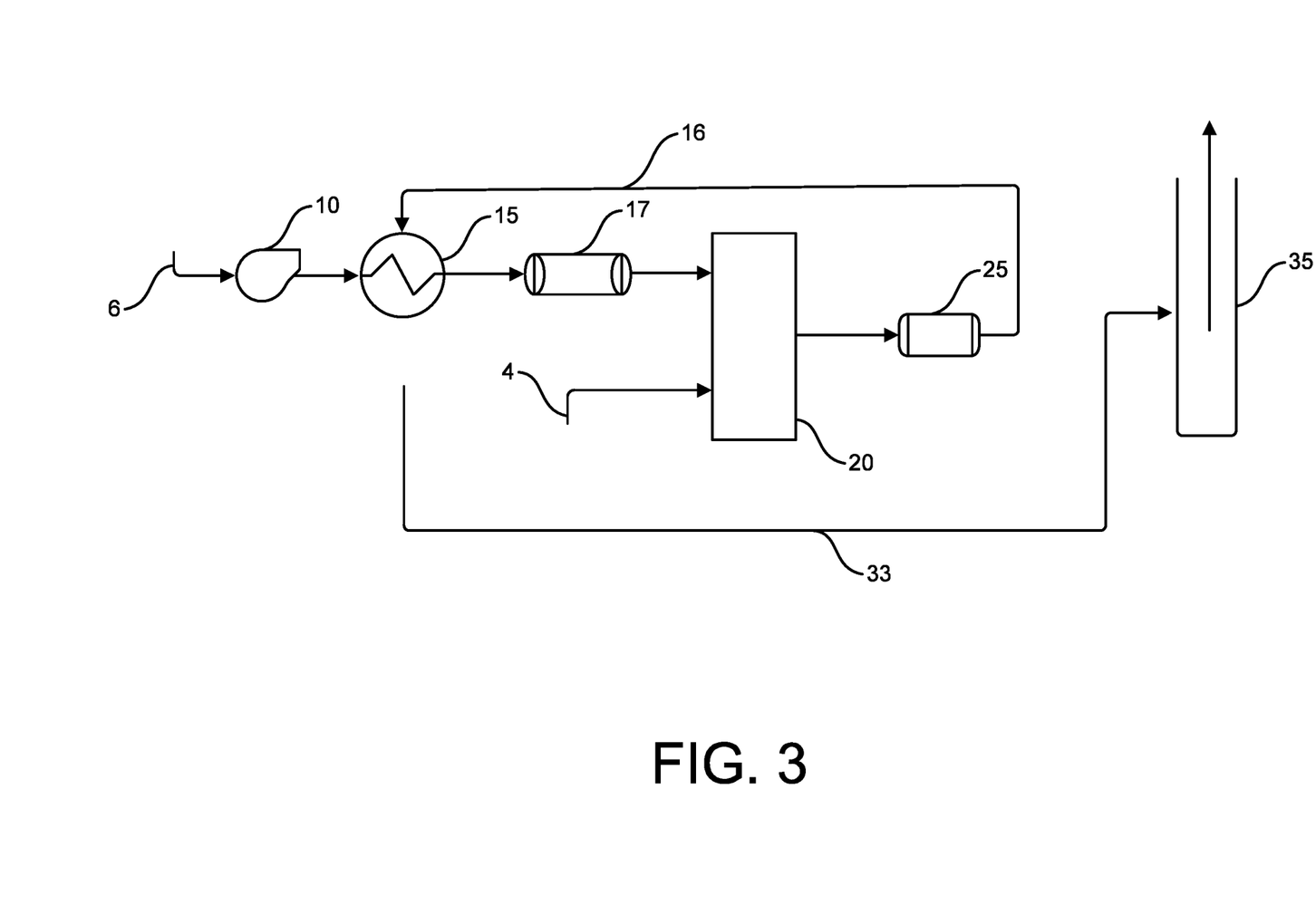
FIG. 3 is a schematic flow diagram of a second embodiment of the present invention.

FIG. 3 illustrates a variation upon the VOC mitigation system seen in FIG. 2. In the FIG. 3 embodiment, the fugitive exhaust gases collected at fan 10 are first transmitted to heat exchanger 15, where the temperature of these gases will in many embodiments be raised closer to 90° C. In one embodiment, heat exchanger 15 is a conventional air-to-air heat exchanger that will begin heating the fugitive exhaust gas stream. The air-to-air heat exchanger will use the higher temperature of the treated exhaust via return line 16 to indirectly preheat the fugitive exhaust entering heat exchanger 15 while simultaneously cooling the treated exhaust. The treated exhaust gases will then be directed to exhaust conduit 35 via exhaust line 33.

In most embodiments, the system components will be positioned in some type of housing such as seen in the figures. However, there could be embodiments where the components seen in FIG. 2 are not within any discrete housing enclosure. It has been found that operating the catalytic converter at about 270° C. removes between 90% and 95% of VOCs from the exhaust stream. However, increasing the operating temperature closer to 350° C. may act to remove close to 99% of VOCs. In most embodiments, the process will remove at least 85% of VOCs (i.e., removing at least any percentage between 85 and 100% depending on design requirements). Although preferred embodiments employ electrically heated catalyst devices, other embodiments could employ gas heated catalyst devices.

Many advantages flow from embodiments of the above described VOC mitigation system. The installation site can be set up, the liner inserted and cured, and the installation equipment moved to the next site within days or as little time as a few hours. These embodiments meet the need for VOC mitigation equipment to be transportable by truck, be durable, robust, able to be handled and moved soon after use, and have a small footprint. The VOC mitigation system is also advantageous in that is can operate despite the high water vapor content of the steam cured CIPP exhaust, the particulate content, and the relatively high flow rate of the CIPP exhaust. Finally, because CIPP installation sites are often in populated areas and in close proximity to residences and public spaces, the controlled exhaust discharge from the elevated stack renders the system safer than prior art alternatives.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%.

Naturally, it will be understood that while the present invention has been described in terms of certain specific examples shown in the Figures, those skilled in the art will recognize many obvious modification and variations beyond these specific examples. All such modifications and variations are intended to fall within the scope of the following claims.

The invention claimed is:

1. An apparatus for removing VOCs from exhaust gases of a CIPP curing process, the apparatus including a housing which comprises:
   (a) a primary exhaust stream conduit from a CIPP liner;
   (b) a fan configured to collect fugitive exhaust and directed it into a fugitive exhaust stream;
   (c) a mixing chamber combining the heated fugitive exhaust stream and the primary exhaust stream to form a combined exhaust stream;
   (d) a heated, hydrophobic catalyst structure receiving the combined exhaust stream;
   (e) an exhaust stack receiving the combined exhaust stream from the preheater and reducing the combined exhaust stream to under 105° C.

2. The apparatus of claim 1, further comprising a preheater receiving the fugitive exhaust stream and configured to raise the fugitive exhaust stream to at least 90° C., while the primary exhaust stream bypasses the preheater.

3. The apparatus of claim 2, further comprising a return line directing the combined exhaust stream from the catalyst structure to a heating fluid inlet of the preheater.

4. An apparatus for removing VOCs from exhaust gases of a CIPP curing process, the apparatus comprising:
   (a) an entry exhaust stream conduit configured to receive exhaust curing steam from a pipe lined with a CIPP liner used to cure the CIPP liner;
   (b) a VOC filter comprising a container in fluid communication with the entry exhaust stream conduit for receiving the exhaust curing steam from the entry exhaust stream conduit, and a hydrophobic active catalyst structure formed for receiving the exhaust curing steam through the catalyst structure, the catalyst structure being heatable to a temperature above ambient selected to promote removal of styrene from the exhaust curing steam; and
   (c) an exit exhaust stream conduit in fluid communication with the VOC filter to receive filtered exhaust curing steam from the VOC filter and exhaust the exhaust curing steam.

5. The apparatus of claim 4 wherein the catalyst structure is configured to be electrically heated.

6. The apparatus of claim 4 wherein the catalyst structure comprises a catalyst washcoat on a metallic foil substrate.

7. The apparatus of claim 6 wherein the catalyst structure further comprises an active catalyst carried by the catalyst washcoat.

8. The apparatus of claim 7 wherein the active catalyst is one of platinum, palladium, or rhodium.

9. The apparatus of claim 7 wherein the catalyst washcoat comprises a porous catalyst carrier material on which the active catalyst is dispersed.

10. The apparatus of claim 9 wherein the carrier material comprises alumina ($Al_2O_3$).

11. A method of treating exhaust steam containing VOCs from a curing process for CIPP liner, the method comprising:
   attaching an entry exhaust stream conduit to the CIPP liner so that exhaust curing steam from the CIPP liner passes into the conduit;
   passing exhaust curing steam from the CIPP liner into the entry exhaust stream conduit through a heated catalyst structure configured to reduce an oxidization temperature of styrene in the exhaust steam thereby to remove styrene from the exhaust steam; and
   discharge exhaust curing steam to the environment after passing through the heated catalyst structure.

12. The method of claim 11 further including heating the catalyst structure with an electrical heating system.

* * * * *